J. EDGAR.
Sheet-Metal Pan.

No. 203,328. Patented May 7, 1878.

Witnesses.
Otto Hufeland
Hugo Brueggemann

Inventor.
James Edgar
by
Van Santvoord & Hauff
his attorneys

UNITED STATES PATENT OFFICE.

JAMES EDGAR, OF NEW YORK, N. Y.

IMPROVEMENT IN SHEET-METAL PANS.

Specification forming part of Letters Patent No. 203,328, dated May 7, 1878; application filed October 26, 1877.

*To all whom it may concern:*

Be it known that I, JAMES EDGAR, of the city, county, and State of New York, have invented a new and useful Improvement in Pans and other like articles of sheet metal, which improvement is fully set forth in the following specification, reference being had to the accompanying drawing, in which—

Figure 1:
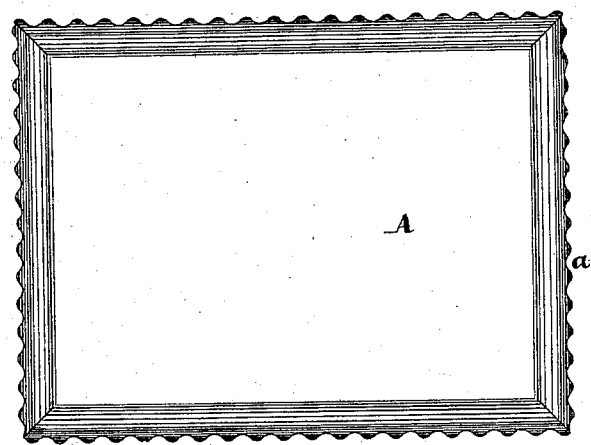
Figure 2:
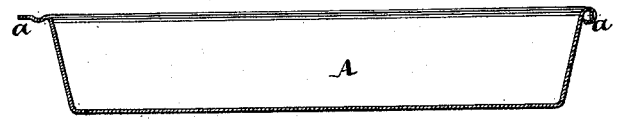
Figure 3:

Figure 1 is a plan or top view. Fig. 2 is a vertical section. Fig. 3 is a cross-section of the rim on a larger scale than in the previous figures.

Similar letters indicate corresponding parts.

This invention consists in the combination of a hollow corrugated tubular rim with the body of a pan or other article of sheet metal, so that the rim is strengthened, and the operation of wiring is superfluous, the corrugations in the tubular rim serving to facilitate the operation of forming the same.

In the drawing, the letter A designates a sheet-metal pan which is provided with a hollow tubular corrugated rim, *a*.

In forming this rim I proceed as follows: The body of the pan is stamped up of sheet metal, a quantity of sheet metal sufficient for the tubular rim being left to project from each edge, as indicated in the drawing. In these projecting flanges I produce, by means of suitable dies, the required corrugations, and thereby the middle portion of each of these flanges is stiffened, so that said flanges can be readily turned down and brought into a tubular form by means of suitable dies, without requiring a mandrel.

If the flanges are left plain or not corrugated, they cannot be formed into tubes without the aid of a mandrel, over which they have to be turned, which operation requires considerable time and labor. By the simple operation of forming corrugations in the middle portions of said flanges much time and labor are saved, and the strength and stiffness of the rims are materially increased.

In the example represented by the drawing, I have shown a square pan of the class known as "dripping-pans;" but my improvement is applicable to all articles of sheet metal the edges of which have to be strengthened.

In applying my invention to square pans I also gain the great advantage that the corners of my rim can be properly finished, no wire being needed, which, when it is used, becomes exposed at the edges, and is liable to corrode and to mar the appearance of the pan.

What I claim as new, and desire to secure by Letters Patent, is—

The combination of a hollow corrugated tubular rim, *a*, with the body A of a pan or other article of sheet metal, substantially as and for the purpose herein shown and described.

In testimony that I claim the foregoing I have hereunto set my hand and seal this 17th day of April, 1877.

JAMES EDGAR. [L. S.]

Witnesses:
W. HAUFF,
E. F. KASTENHUBER.